3,547,616
METHOD OF CONTROLLING UNWANTED PLANT GROWTH

Adolf Fischer, Mutterstadt, Pfalz, and Hans Richard Mueller, Fussgoenheim, Germany, assignors to Badische Anilin- & Soda-Fabrik Aktiengesellschaft, Ludwigshafen (Rhine), Germany
No Drawing. Filed June 1, 1967, Ser. No. 642,703
Claims priority, application Germany, June 30, 1966, 1,542,829
Int. Cl. A01n 9/12
U.S. Cl. 71—90
5 Claims

ABSTRACT OF THE DISCLOSURE

The use of substituted benzothiadiazoles-(2,1,3) for controlling unwanted plants without injuring crop plants.

---

It is known that nitrophenol derivatives, in particular 2-methyl-4,6-dinitrophenol, may be used for controlling undesirable plants. However their action is not satisfactory.

One object of this invention is to provide a method of controlling unwanted plants with substituted benzothiadiazoles. Another object of the invention is to treat plants with said compounds in such a way that the unwanted plants are injured and the crop plants continue to grow normally. A further object of the invention is to treat the soil in which the plants are to grow or are already growing with said compounds in such a way that the unwanted plants are destroyed. Yet another object of the invention is to destroy all the plants on a specific site in order that crop plants may be sown or planted in the soil shortly afterwards.

These and other objects of the invention are achieved by using benzothiadiazoles-(2,1,3) having the formula

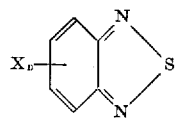

in which X denotes a nitro, hydroxy, amino or alkyl radical and $n$ is one of the integers 1 to 3.

They are effective in both pre- and post-emergence methods. They are suitable for the selective destruction of specific groups of unwanted plants as well as for the complete destruction of all plants.

The following compounds are examples of the active ingredients according to the invention: 4-nitrobenzothiadiazole-(2,1,3); 5-nitrobenzothiadiazole-(2,1,3); 5-aminobenzothiadiazole-(2,1,3).

4-nitrobenzothiadiazole-(2,1,3) and its preparation are described in German patent specification 765,971. The other compounds may be obtained by analogous methods.

The agents according to this invention may be used as solutions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for diluting with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The compounds according to the invention may be mixed with known herbicidal agents, e.g., substituted urea derivatives, triazine derivatives, carbamate derivatives, pyridazone derivatives and chlorinated fatty acid esters.

The following examples illustrate the application of the agents according to the invention.

EXAMPLE 1

In a greenhouse the plants beet (*Beta culgaris*), barley (*Hordeum culgare*), wheat (*Triticum vulgare*), rye (*Secale cereale*), Indian corn (*Zea mays*), chamomile (*Matricaria chamomilla*), common chickweed (*Stellaria media*), jointed charlock (*Raphanus raphanistrum*), white goosefoot (*Chenopodium album*), small nettle (*Urtica urens*), corn marigold (*Chrysanthemum segetum*), vetch (Vicia spp.), annual meadow grass (*Poa annua*), perennial ryegrass (*Lolium perenne*) and barnyard grass (*Panicum crusgalli*) were treated at a growth height of 4 to 17 cm. with 4-nitrobenzothiadiazole-(2,1,3) (I) and, for comparison, with 2-methyl-4,6-dinitrophenol (II) at a rate of 3 kg. of active ingredient dispersed in 500 liters of water per hectare. After eight to fourteen days it was observed that compound I has a stronger herbicidal action than compound II and at the same time better compatibility with the crop plants, especially beet. The results of the experiment can be seen in the following table.

| Plants | Active ingredient | |
|---|---|---|
| | I | II |
| Crop plants: | | |
| Beet | 0 | 70 |
| Barley | 5–10 | 10 |
| Wheat | 10 | 10–20 |
| Rye | 10 | 20 |
| Indian corn | 5–10 | 20–30 |
| Unwanted plants: | | |
| Chamomile | 90–100 | 80 |
| Common chickweed | 100 | 80–90 |
| Jointed charlock | 100 | 90–100 |
| White goosefoot | 100 | 90–100 |
| Small nettle | 100 | 100 |
| Corn marigold | 90–100 | 90 |
| Vetch | 90–100 | 80 |
| Annual meadow grass | 90–100 | 30 |
| Perennial ryegrass | 90–100 | 20 |
| Barnyard grass | 80 | 20–30 |

NOTE: 0=No damage.
100=Complete destruction.

EXAMPLE 2

A cultivated area which was uniformly infested with weeds was sprayed with 4-nitrobenzothiadiazole-(2,1,3) (I) and, in comparison, with 2-methyl-4,6-dinitrophenol (II) at a rate of 10 kg. of active ingredient dispersed in 500 liters of water per hectare. Two to three weeks later the plants chamomile (*Matricaria chamomilla*), common chickweed (*Stellaria media*), jointed charlock (*Raphanus raphanistrum*), white goosefoot (*Chenopodium album*), small nettle (*Urtica urens*), corn marigold (*Chrysanthemum segetum*), vetch (Vicia spp.), annual meadow grass (*Poa annua*), perennial ryegrass (*Lolium perenne*) had all been destroyed by I, whereas only 76% of the plants had been killed by II.

A short while afterwards cereals were sown without any injury to the cereals being observed.

The following compounds have the same biological action as I in Examples 1 and 2: 5-nitrobenzothiadiazole- (2,1,3); 5-aminobenzothiadiazole-(2,1,3); 4-amino-5,7-dibromobenzothiadiazole-(2,1,3).

We claim:
1. A method of selectively controlling unwanted plants without injuring crop plants which comprises: applying to the soil as the situs for the growth of said crop plants a phytotoxic amount, with reference to said unwanted plants, of a herbicidal compound of the formula

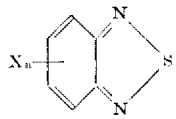

wherein X is a substituent selected from the class consisting of nitro and amino and $n$ is an integer of 1 to 3, inclusive.

2. A method as claimed in claim 1 wherein said herbicidal compound is applied to a soil containing unwanted plants prior to the planting of crop plants.

3. A method as claimed in claim 1 wherein said herbicidal compound is applied to a soil in which both the unwanted plants and crop plants are growing.

4. A method as claimed in claim 1 wherein said herbicidal compound is 4-nitrobenzothiadiazole-(2,1,3).

5. A method as claimed in claim 1 wherein said herbicidal compound is 5-nitrobenzothiadiazole-(2,1,3).

References Cited
UNITED STATES PATENTS

| | | | |
|---|---|---|---|
| 3,478,044 | 11/1969 | Slott et al. | 71—90X |
| 3,279,909 | 10/1966 | Dooms et al. | 71—90 |

JAMES O. THOMAS, JR., Primary Examiner

PO-1050
(5/69)

UNITED STATES PATENT OFFICE
CERTIFICATE OF CORRECTION

Patent No. 3,547,616      Dated December 15, 1970

Inventor(s) Adolf Fischer et al

It is certified that error appears in the above-identified patent and that said Letters Patent are hereby corrected as shown below:

Column 2, line 16, "culgaris" should read -- vulgaris --; line 17, "culgare" should read -- vulgare --.

Column 4, line 13, in the references, "Slott et al." should read -- Slatt et al. --.

Signed and sealed this 30th day of March 1971.

(SEAL)
Attest:

EDWARD M. FLETCHER, JR.      WILLIAM E. SCHUYLER, JR.
Attesting Officer      Commissioner of Patents